United States Patent [19]
Warthen

[11] 3,888,037
[45] June 10, 1975

[54] POLYCHROIC FISHING LINE

[75] Inventor: Raymond L. Warthen, Spirit Lake, Iowa

[73] Assignee: Berkley & Company, Inc., Spirit Lake, Iowa

[22] Filed: Jan. 21, 1974

[21] Appl. No.: 435,288

[52] U.S. Cl. ............................................. 43/44.98
[51] Int. Cl. ........................................... A01k 91/00
[58] Field of Search ................... 43/44.98; 161/175

[56] References Cited
UNITED STATES PATENTS
1,578,189  3/1926  Dawson ........................... 43/44.98
1,982,304  11/1934  Holden ........................... 43/44.98

*Primary Examiner*—Warner H. Camp

[57] ABSTRACT

A camouflaged polychroic fishing line which consists of an elongated length of line including a base or continuum of a plurality of discretely colored adjacent segments of substantially uninterrupted color transitions. The line consists of adjacent segments of either random or ordered sequence, wherein one group of segments forming the continuum is of a chroma having a basic foundation in a first primary color and a second group of segments forming the continuum is of a chroma having a basic foundation in a second primary color. A third group from the third primary color may be utilized as well. Connective segments are provided which extend between individual of the first and of the second segments and/or third segments so as to provide each individual segment with a neighbor with a smooth color transition such as adjacents having chromas spaced apart on the standard chromaticity chart by a total difference in the sum of the coordinates being less than about 0.4.

14 Claims, 6 Drawing Figures

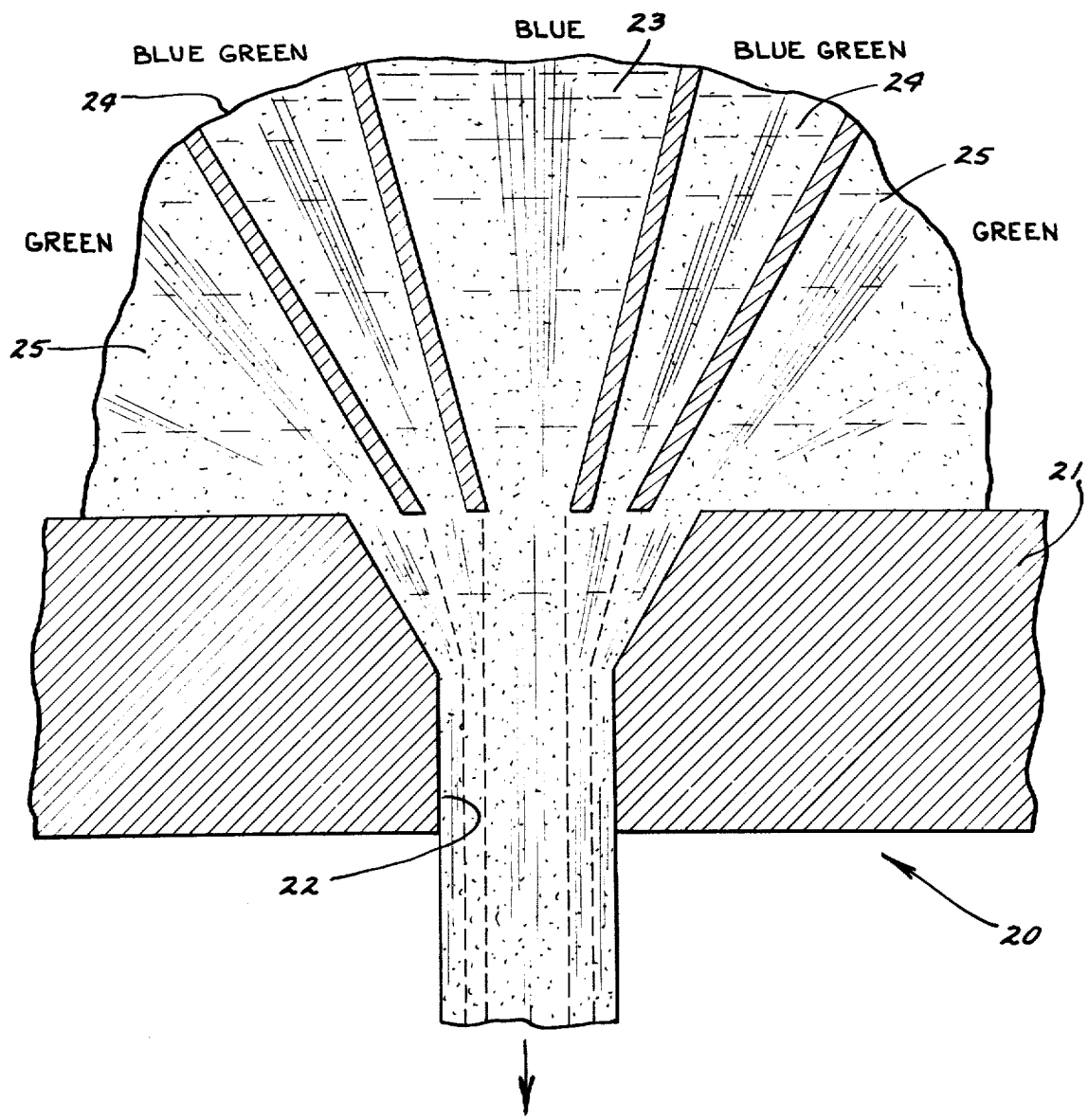

POLYCHROIC FISHING LINE

BACKGROUND OF THE INVENTION

The present invention relates generally to an improved colored fishing line, and more specifically to an improved colored monofilament fishing line which is provided with blends of colors to achieve a camouflage affect. Throughout nature, polychroic blends of colors are found with these various blends varying across the entire visible color spectrum. In order to achieve a camouflage affect, nature utilizes subtle differences in color, with very little discontinuity or smooth transitions being present in transposing from one color to another. This is achieved through the utilization of gradual progressions of change, so as to achieve a camouflage affect with the contrast between adjacent colors being both modest and subtle.

In nature, colors are found which are normally not pure colors. True red, for example, is rare. Most of the colors found in nature, particularly in wild beasts and the like are colored for example with blends of red and yellow so as to produce a reddish orange or rust color; or perhaps blends of red and green to produce brownish tones. Generally speaking, in nature, heterogenous colors are found with normal color transitions occurring when these various tones are found. Primarily, transitions travel through various intermediate tones or shades of colors found in the visible spectrum and generally in an orderly fashion of gradual progression.

In producing a fishing line having a desirable camouflage color scheme, it is desirable to utilize a continuous transition in colors which moves through the visible spectrum along a gradual progressional scale. In a camouflaged fishing line, the user will normally select one which utilizes the primary colors red and yellow, so as to camouflage the line against a sandy background, and will utilize a line employing the primary colors red and blue to achieve a camouflage affect against a normal dark background such as dark stone. A line having a pair of primary colors yellow and blue may be utilized to achieve a camouflage affect against a green or greenish background, such as may be encountered in certain other marine environments.

At the present time, fishing lines are available which are designed as camouflaged line. These lines typically may consist of sequential colors arranged in a progression consisting of mutually adjacent colors of tan, green, brown, gold, rose, and thus reversed back to tan. It will be readily apparent that wherever the tan colored segment forms a juncture with the green segment, or where the bronze segment and the gold segment meet, the color transition line will be abrupt and the line, while otherwise camouflaged, becomes highly visible at this point. Another example of a camouflaged line in common usage utilizes the following segments having colors sequenced in a manner based upon wave length: 582 m$\mu$; 480 m$\mu$; 515 m$\mu$; and 410 m$\mu$. It will be appreciated, therefore, that the pattern is not one which provides gradually ascending, or gradually descending wave lengths, but one which in effect progresses in random fashion without continual regard to the color characteristic of adjoining or neighboring segments.

While it is possible to utilize various shades of all three of the primary colors in a single line, it has normally been found that camouflage techniques are best employed when two primary colors are utilized with the segments of the line being selected so as to have a first plurality of segments of a chroma having its basic foundation in a first primary color, such as red, and a second plurality of segments being of a chroma having its basic foundation in a second primary color such as blue. The transition will then move through adjoining segments of ultramarine blue, light blue, light purple, and perhaps a dark purple. Such a line will be well adapted for use in connection with a marine environment which is against a blue-based background, such as is found on a clear day in areas with dark stone or rock bottom.

In order to relate the color concept to fishing lines of the present invention, it has been found that fishing lines, particularly colored monofilament lines, may make use of the subtle transitions and gradual progressions of color to achieve surface and sub-surface characteristics which tend to camouflage the line when introduced into the body of water. The selection of an appropriately colored line with controlled transitions will tend to cause these lines to blend into the aquatic surroundings in either a sandy bottom lake, blue water, green water, or in a relatively thick weed bed in a body of water.

In the preparation of nylon monofilament fishing lines, the various colors may be applied as dyes, pigments, dispersions, and the like. These various colors may be applied to the monofilament either by dying the bulk material in certain embodiments, or by surface application in certain other embodiments. These individual lines can also be dyed on rolled hands or dyed continuously, with a number of colors and half-tones being varied over various colors or shades of the same color.

The color transitions are typically graded or gradual transitions, with abrupt transitions being avoided. Thus, individual segments will be separated from neighboring segments by an orderly progression of colors, particularly an orderly progression of adjacent colors from the color scale. For example, one typical camouflage line may consist of colored segments arranged in an orderly sequence of colors of increasing wave length from blue to green to yellow, with the colors of the individual segments changing shade by only modest changes in wave length.

These individual segments may be either transverse axially spaced segments, or, in the alternative, radial arcuate segments of varying shades. In still a further embodiment of the invention, co-axial segments of varying colors or shades of colors may be employed to achieve longitudinal di- or polychroism.

SUMMARY OF THE INVENTION

One of the recognized standards employed today for determining colorimetric datum is the Chromaticity Coordinate Chart for locating a color or shade in a precise numerical manner plotted on an algebraic graph basis, utilizing $x$ and $y$ coordinates. This chromaticity diagram is utilized to obtain a measure of the chroic condition, as well as the relative lightness or darkness of the color pattern. This standard may be utilized to determine the manner in which the camouflage is employed in the fishing line of the present invention, with this diagram being reproduced and illustrated in FIG. 4 of the drawings and with the color sequence of a typical line being reproduced thereon.

Therefore, it is a primary object of the present invention to provide an improved polychroic fishing line which comprises a plurality of individually colored segments which are colored in a gradual progression of colors so as to achieve an orderly progression of adjacent colors which are properly camouflaged, one to another.

It is a further object of the present invention to provide an improved polychroic fishing line which comprises a continuum of line consisting of a first plurality of segments of a chroma having a basic foundation in a first primary color, and a second plurality of segments of a chroma having a basic foundation in a second primary color, with connective segments extending between these segments to provide an arrangement wherein each neighboring segment pair may be described as color "adjacents," or wherein each segment of a neighboring pair has a chroma spaced apart from that of its neighbor by a difference in the sum of coordinates on the standard Chromaticity Chart of less than about 0.4.

It is yet a further object of the present invention to provide an improved nylon monofilament fishing line which is properly camouflaged so as to provide gradual progression color changes throughout the length of the line.

It is yet a further object of the present invention to provide an improved arrangement for achieving camouflage in fishing line wherein color changes may occur due to modifications in color which extend either transversely of the line axis, transitions which occur generally parallel to the line axis, or transitions which occur as radial arcuate segments.

Other and further objects of the present invention will become apparent to those skilled in the art upon a study of the following specification, appended claims, and accompanying drawings.

BRIEF DESCRIPTION OF THE DRAWINGS

FIG. 6 is a sectional view of a typical co-extrusion monofilament dye for the preparation of a sheath core co-extrusion, such as is illustrated in the structure of FIG. 3.

DESCRIPTION OF THE PREFERRED EMBODIMENT

In order to comprehend the various aspects of the present invention, a number of specific examples will be provided herein:

EXAMPLE 1

Nylon monofilament line was prepared pursuant to the teachings of U.S. Pat. No. 3,182,100, Berkley W. Bedell, utilizing a mixture of e-caprolactam and hexamethylene adipamide, known as nylon 6/66. This line was prepared with 9-inch transverse periodically repeating segments with the following color pattern:

480 m$\mu$, 490 m$\mu$, 515 m$\mu$, 560 m$\mu$, 578 m$\mu$; with this orderly progression proceeding in increasing wave lengths from blue to green to yellow, and thereafter with the same colors being arranged together but in decreasing order; such as:

578 m$\mu$, 560 m$\mu$, 515 m$\mu$, 490 m$\mu$, 480 m$\mu$. Relating this structure to the Chromaticity Chart of FIG. 4, the structure proceeds as follows:

| Blue | $y = 0.21$ |
| | $x = 0.18$ |
| Blue green | $y = 0.31$ |
| | $x = 0.15$ |
| Green | $y = 0.55$ |
| | $x = 0.15$ |
| Yellow green | $y = 0.51$ |
| | $x = 0.39$ |
| Yellow | $y = 0.44$ |
| | $x = 0.42$ |

An $x$ - $y$ plot of these coordinates not only shows that the colors undergo gradual and progressive transition from blue to green, and thereon from green to yellow, but also because of their location, all colors and mixtures of colors are of medium shades.

Figure 5:
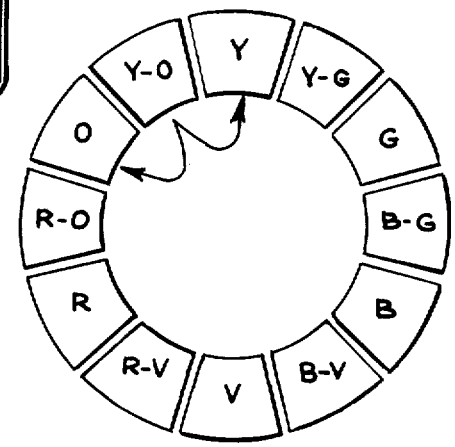
FIG. 5 is a standard 12-member color chart which may be utilized to assist in the selection of appropriate colors pursuant to the aspects of the present invention.

This structure can also be related to the color chart illustrated in FIG. 5, with the structure utilizing adjacently disposed colors in this standard chart reference. In this connection, therefore, these colors proceed from the ultramarine blue toward the yellow, and pick up the changes in spectral colors as the progression proceeds, as is shown in superimposed relationship in FIG. 5.

EXAMPLE 2

The nylon material set forth in Example 1 was employed, with darker shades being selected for this material. The wave length selected or progression of wave length was identical to that set forth in Example 1 hereinabove, as being as follows:

480 m$\mu$, 490 m$\mu$, 515 m$\mu$, 560 m$\mu$, 578 m$\mu$, and descending in the reverse order. Relating this structure to the Chromaticity Chart, however, the following coordinates were selected:

| Blue | $y = 0.16$ |
| | $x = 0.15$ |
| Blue green | $y = 0.31$ |
| | $x = 0.10$ |
| Green | $y = 0.64$ |
| | $x = 0.10$ |
| Yellow green | $y = 0.54$ |
| | $x = 0.40$ |
| Yellow | $y = 0.48$ |
| | $x = 0.47$ |

Figure 1:
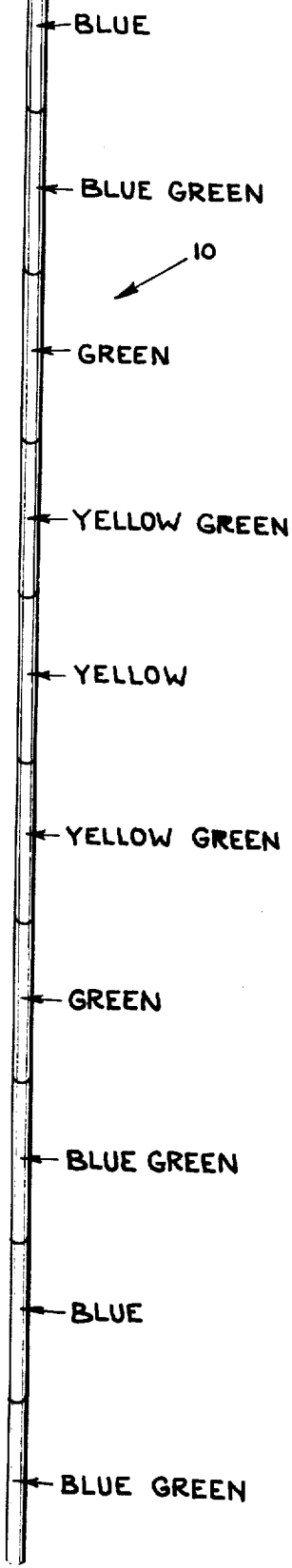
FIG. 1 is an isometric view of a segment of line prepared in accordance with the present invention, and having adjacent transverse segments colored pursuant to the aspects of the present invention.
Figure 4:
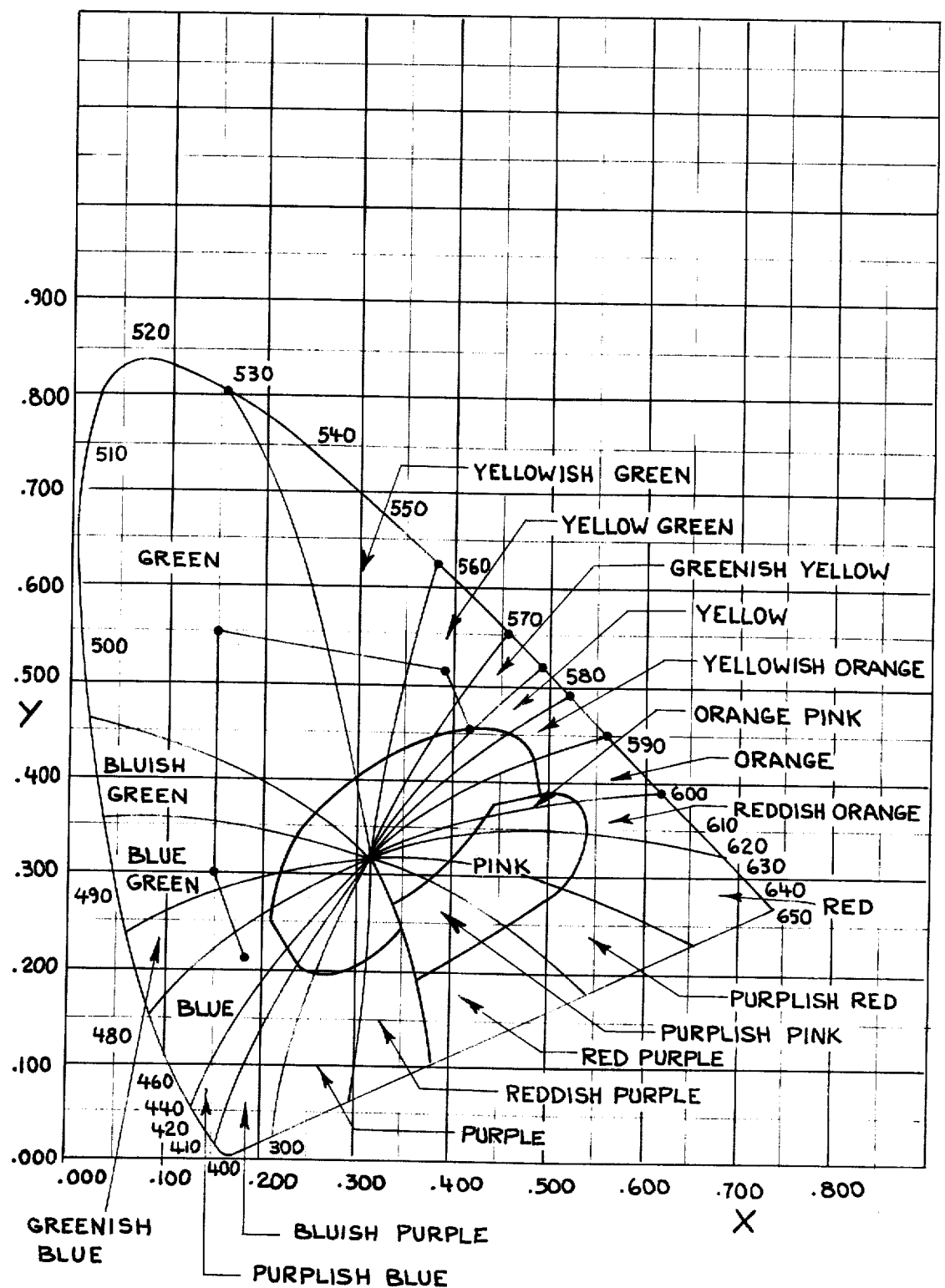
FIG. 4 is a reproduction of a standard Chromaticity Chart and illustrating one example of a fishing line with pre-selected colors shown on the chart.

To achieve these colors and product a monofilament line as shown with exaggerated diameter at 10 in FIG. 1, with a typical 10-inch transverse periodicity, the surface of clear monofilament over a 30-inch length is initially dyed blue. Thereafter, over a second 30-inch length, utilizing the last 10-inches of the initial blue section, a green dye is applied. This provides a pattern with a 20-inch blue section, a 10-inch blue-green section, followed by a 20-inch green section. Over the next 30-inch length, utilizing the last 10-inch length of the green segment, a yellow dye is applied so as to give a product with an initial 20-inch blue section, a 10-inch blue-green section, a 10-inch green section, a 10-inch yellow-green section, and a 20-inch yellow section. Over the next 30-inch section, utilizing the last 10-inch length of the yellow dyed line, the blue dye used initially is again applied so as to give the desired pattern of sequence. Conventional dye application techniques may be employed, such as, for example, a dip coating, the use of a dye pad, or the like. The product obtained in this arrangement is illustrated in FIG. 4 of the drawings, wherein the Chromaticity Coordinates are also given. While individual segment lengths of 10-inches in length are given, segments of from about 3 inches to about 36 inches may be utilized.

The structure may also be related to the Chromaticity Chart of FIG. 4, with the color changes proceeding approximately as follows:

| Blue | $y = 0.21$ |
| | $x = 0.18$ |
| Blue green | $y = 0.31$ |
| | $x = 0.15$ |
| Green | $y = 0.55$ |
| | $x = 0.15$ |
| Yellow green | $y = 0.51$ |
| | $x = 0.39$ |
| Yellow | $y = 0.44$ |
| | $x = 0.42$ |

EXAMPLE 3

The nylon monofilament line as prepared in Example 1 was mixed with individual dyes so as to achieve a group of molding pellets having the colors as represented by the pattern in Example 1, with these colors being as follows:

| Blue | $y = 0.21$ |
| | $x = 0.18$ |
| Blue green | $y = 0.31$ |
| | $x = 0.15$ |
| Green | $y = 0.55$ |
| | $x = 0.15$ |
| Yellow green | $y = 0.51$ |
| | $x = 0.39$ |
| Yellow | $y = 0.44$ |
| | $x = 0.42$ |

These individual pellets were then introduced into the pressure chamber of an extrusion system and co-extruded so as to form a product with random, but ordered, change in color. Initially, the blue pellets were introduced into the chamber and the extrusion started. The blue-green pellets were then co-mingled with the blue with the extrusion continuing until the initial blue charge was exhausted. At this point, the green pellets were added and the extrusion continued until the blue-green pellets were essentially exhausted, at which point the yellow-green pellets were introduced into the chamber and the process continued. This procedure provides a product having arcuate segments of varying colors, with the individual segments having gradual or slow transitions from the base color into the next succeeding color.

EXAMPLE 4

A nylon monofilament line was prepared utilizing the molding pellets as set forth hereinabove in connection with Example 3. The extrusion was accomplished by co-extrusion of three colored pellets simultaneously, for example, the blue, blue-green, and green pellets were extruded coaxially so as to provide a product with a core of one material and a pair of coaxial sheaths of differing colors laid thereover. As the extrusion continues, it is noted that the core material, being blue, will be covered by a first sheath of blue-green, and a second sheath of essentially green material. In each of these cases, the individual colors are preferably faint or pale, with the line segments being generally translucent. As the extrusion continues, the order may be changed, wherein a core material of blue-green pellets may be utilized covered by coaxial sheaths of green and yellow-green respectively.

For most purposes, the co-extruded mixture of this arrangement should be related to the Chromaticity Chart of FIG. 4, with the structure proceeding as follows:

| Blue | $y = 0.24$ |
| | $x = 0.22$ |
| Blue green | $y = 0.33$ |
| | $x = 0.23$ |
| Green | $y = 0.38$ |
| | $x = 0.28$ |
| Yellow green | $y = 0.43$ |
| | $x = 0.36$ |
| Yellow | $y = 0.45$ |
| | $x = 0.44$ |

EXAMPLE 5

A nylon monofilament line was prepared utilizing the mixture of e-caprolactam and hexamethylene adipamide as set forth in Example 1. This line was prepared with 10-inch transverse periodically repeating segments with the following color pattern:

| Blue (medium) | $y = 0.15$ |
| | $x = 0.13$ |
| Bluish purple (medium, "blue violet") | $y = 0.10$ |
| | $x = 0.20$ |
| Medium purple (violet) | $y = 0.11$ |
| | $x = 0.26$ |
| Red purple (medium, "red violet") | $y = 0.18$ |
| | $x = 0.44$ |
| Red (medium) | $y = 0.29$ |
| | $x = 0.64$ | with this orderly progression proceeding in increasing wave lengths from blue to blue-violet, to violet, to red-violet, and ultimately to essentially red.

An x - y plot of these coordinates not only shows that the colors undergo gradual and progressive transition from blue to violet, and thereon from violet to essentially red, but also because of their location on the Chromaticity Chart, all colors and mixtures of colors are of medium to dark shades. Such a line, will, of course, be useful on a clear day in a body of water with a dark bottom material such as blue or black stone or the like.

EXAMPLE 6

The colors as set forth in Example 5 were emloyed in ordered sequence in the co-extrusion system as described in Example 3 with satisfactory results.

EXAMPLE 7

The colors as set forth in Example 5 were employed in ordered sequence in the co-extrusion system as described in Example 4 with satisfactory results.

Figure 3:
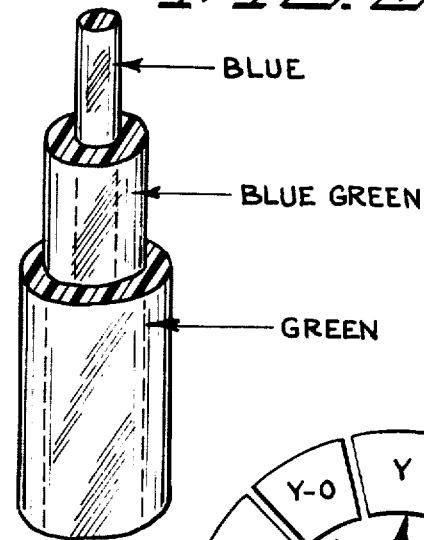
FIG. 3 is an isometric view of the segment of line prepared pursuant to another aspect of the present invention wherein coaxially layering is achieved.

Attention is now directed to FIG. 6 of the drawings wherein a typical co-extrusion die utilized for the preparation of a sheathed core of co-extruded monofilament fishing line. The die makes it possible to prepare a sheathed monofilament with a variety of colors and which will appear to be camouflaged, depending upon the direction of incident light, and the direction of viewing of the line. Typically, this die can be utilized to prepare the line structure illustrated in FIG. 3.

Whenever a co-extrusion is conducted utilizing a sheathed core structure, it is possible to utilize diverse materials without causing the fiber to crimp. For example, a nylon core may be utilized such as the blue core in FIG. 3, with a polyester sheath being utilized for the blue-green and green members of the line.

Typically, an extruder head such as the die 20 of FIG. 6 will have an orifice plate 21 having an orifice 22 formed therein, with the orifice being fed by three co-axial supplies such as the central core supply 23, a first sheath supply 24, and a second sheath supply 25. These techniques are, of course, well known in the art.

Figure 2:
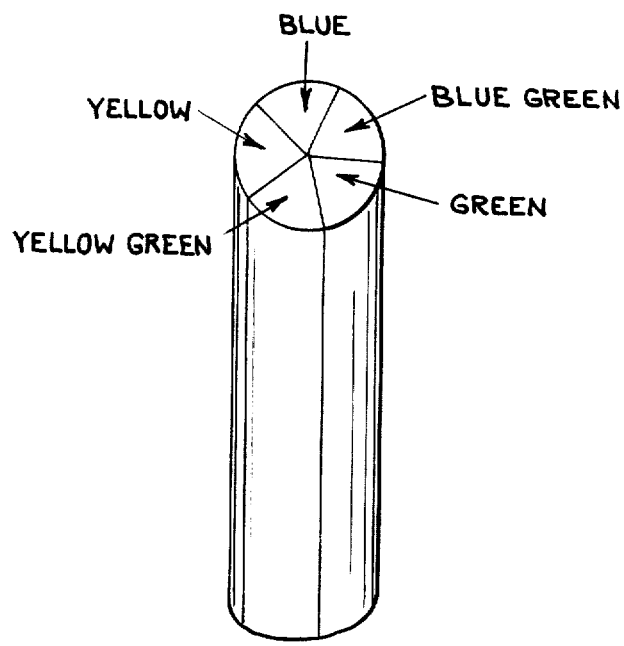
FIG. 2 is a view similar to FIG. 1, and illustrating a product colored pursuant to the aspects of the present invention, and wherein the product is colored by virtue of a range of radial arcuate segments.

In order to prepare the structure as illustrated in FIG. 2, a modified die arrangement is utilized in the form of arcuate sectors. In this arrangement as illustrated in FIG. 2, five 75° arcuate sectors will be employed to feed material to a common orifice. Such extrusion heads are known in the art.

It will be appreciated, therefore, that the line structure of the present invention can be fabricated from a variety of techniques, each technique providing a camouflage effect for the ultimate line to be prepared. Essentially, for most camouflage lines, the graded color scheme will become apparent on viewing various different segments of the line at different incident angles, relative to the direction of incident illumination.

I claim:

1. Polychroic fishing line comprising:
   a. a continuum of line consisting of a plurality of discretely colored segments including a first plurality of individual line segments being of a chroma having a basic foundation and a first primary color and a second plurality of individual line segments being of a chroma having a basic foundation in a second primary color, and connective segments within said continuum and extending between individual members of said first individual and said second individual segments;
   b. the arrangement being such that each individual segment is arranged with each of its neighbors having a chroma spaced apart on the standard Chromaticity Chart by a difference in the sum of the co-ordinates being less than about 0.4.

2. The polychroic fishing line as defined in claim 1 being particularly characterized in that the difference in the sum of the coordinates is less than about 0.3.

3. The polychroic fishing line as defined in claim 1 being particularly characterized in that the chromas of adjacent segments are spaced apart on the standard Chromaticity Chart by less than about two spectral colors.

4. The polychroic fishing line as defined in claim 3 being particularly characterized in that the color of said discretely colored segments is arranged in an orderly progression which is repetitive throughout the length of said line.

5. The polychroic fishing line as defined in claim 1 being particularly characterized in that said line is dyed with a certain predetermined color, and that this color comprises a mean between two related colors, each of said related colors having a basic foundation in different primary colors.

6. The polychroic fishing line as defined in claim 1 being particularly characterized in that said discretely colored segments are segments of line length having a size of between 3 inches and 36 inches.

7. Polychroic fishing line comprising:
   a. a continuum of line consisting of a plurality of discretely colored segments including a first plurality of segments being of a chroma having a basic foundation in a first primary color and a second plurality of segments being of a chroma having a basic foundation in a second primary color, and connective segments extending between individual of said first and said second segments;
   b. the arrangement being such that each individual segment is arranged with each of its neighbors having a chroma which is selected from those colors appearing next adjacent on the standard 12-member color chart.

8. The polychroic fishing line as defined in claim 7 being particularly characterized in that each individual segment is arranged with each of its neighbors having a chroma spaced apart on the standard Chromaticity Chart by a difference in the sum of the coordinates being less than about 0.4.

9. The polychroic fishing line as defined in claim 8 being particularly characterized in that the color of said discretely colored segments is arranged in an orderly progression which is repetitive throughout the length of said line.

10. The polychroic fishing line as defined in claim 7 being particularly characterized in that said discretely colored segments comprise individual transverse lengths of line, each having a size of from 3 to 36 inches.

11. The polychroic fishing line as defined in claim 7 being particularly characterized in that each of said segments represents a radial arcuate segment which does not exceed about 180° of arc.

12. The polychroic fishing line as defined in claim 7 being particularly characterized in that each of said segments is coaxially disposed along said continuum of line.

13. The polychroic fishing line as defined in claim 7 being particularly characterized in that each of said discretely colored segments carries said color throughout the bulk thereof.

14. The polychroic fishing line as defined in claim 7 being particularly characterized in that each of said discretely colored segments is provided with a surface coating of dye.

* * * * *